United States Patent
Lu et al.

(10) Patent No.: US 8,060,087 B2
(45) Date of Patent: Nov. 15, 2011

(54) CDMA INTELLIGENT NETWORK SYSTEM AND ITS METHOD, DEVICE FOR REALIZING INTERNATIONAL ROAMING SERVICE

(75) Inventors: Xuanming Lu, Shenzhen (CN); Junrong Xu, Shenzhen (CN); Jianjun Ding, Shenzhen (CN); Yongfeng Cai, Shenzhen (CN); Haifeng Xu, Shenzhen (CN); Taiyong Dun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 12/243,399

(22) Filed: Oct. 1, 2008

(65) Prior Publication Data

US 2009/0036122 A1 Feb. 5, 2009

Related U.S. Application Data

(63) Continuation of application No. PCT/CN2007/000343, filed on Jan. 31, 2007.

(30) Foreign Application Priority Data

Apr. 26, 2006 (CN) .......................... 2006 1 0075728

(51) Int. Cl.
*H04B 7/216* (2006.01)
*H04W 88/00* (2009.01)
*H04W 88/18* (2009.01)
(52) U.S. Cl. .................. 455/433; 455/432.1; 455/432.3; 455/560
(58) Field of Classification Search .............. 455/422.1, 455/432.1, 428
See application file for complete search history.

(56) References Cited

U.S. PATENT DOCUMENTS 5,890,063 A * 3/1999 Mills .............................. 455/433
6,526,033 B1 2/2003 Wang et al.
6,975,852 B1 * 12/2005 Sofer et al. .................... 455/408
(Continued)

FOREIGN PATENT DOCUMENTS

CN 1443016 A 9/2003
(Continued)

OTHER PUBLICATIONS

Written Opinion of the International Searching Authority in corresponding PCT Application No. PCT/CN2007/000343 (May 17, 2007).

*Primary Examiner* — Ajit Patel
*Assistant Examiner* — Erica Navar
(74) *Attorney, Agent, or Firm* — Leydig, Voit & Mayer, Ltd.

(57) ABSTRACT

The present invention discloses a CDMA intelligent network system and a method for implementing an international roaming service. The CDMA intelligent network system includes: a Home SCP, a Home Gateway Mobile Switching Center (GMSC) or Home International Switching Center (ISC), and a visited GMSC or visited ISC; further, the CDMA intelligent network system includes a roaming SSP. The SCP is in communication with the roaming SSP, and voice channels are established among the roaming SSP, the Home GMSC or ISC, and the visited GMSC or ISC. The present invention further discloses a roaming Service Switching Point, which is adapted for signaling exchanging with the Home SCP of subscriber in international roaming, so as to establish a service route for the subscriber in international roaming in the CDMA intelligent network.

12 Claims, 6 Drawing Sheets

U.S. PATENT DOCUMENTS

| | | | | |
|---|---|---|---|---|
| 7,428,414 B2 * | 9/2008 | Kumar et al. | ............... | 455/432.1 |
| 2003/0100304 A1 * | 5/2003 | Hazelwood | ................... | 455/433 |
| 2004/0058709 A1 * | 3/2004 | Zabawskyj et al. | ........... | 455/560 |
| 2004/0166855 A1 * | 8/2004 | Shang et al. | ................ | 455/435.1 |
| 2005/0090247 A1 * | 4/2005 | Tornkvist | ................... | 455/432.1 |
| 2005/0192035 A1 * | 9/2005 | Jiang | ............................. | 455/461 |

FOREIGN PATENT DOCUMENTS

| | | |
|---|---|---|
| CN | 1645968 A | 7/2005 |
| CN | 1652540 A | 8/2008 |
| CN | 1968428 B | 7/2010 |
| KR | 2005-0122528 A | 12/2005 |

* cited by examiner

CDMA INTELLIGENT NETWORK SYSTEM AND ITS METHOD, DEVICE FOR REALIZING INTERNATIONAL ROAMING SERVICE

CROSS-REFERENCE TO RELATED APPLICATIONS

This application is a continuation of International Patent Application No. PCT/CN2007/000343, filed Jan. 31, 2007, which claims priority to Chinese Patent Application No. 200610075728.6, filed Apr. 26, 2006, both of which are hereby incorporated by reference in their entirety.

FIELD OF THE INVENTION

The present invention relates to the filed of telecommunications, in particular, to a method and system for implementing an international roaming service.

BACKGROUND OF THE INVENTION

As the global economic integration evolves, economic exchanges and people contacts among countries is getting increasingly popular. Accordingly, in a CDMA system, a user has a common demand for international roaming.

Presently in the world, most operators of mobile communication system have entered into agreements on signaling connections between countries and settlement between the operators for CDMA roaming, so that the international roaming of a Post-Paid Charging subscriber can be properly implemented. However, for a Pre-Paid Charging subscriber, the charging for which is always accomplished in the Home Public Land Mobile Network (HPLMN) because account information of the subscriber is stored on a Home Service Control Point (SCP) in the HPLMN. In other words, each time acting as a calling party or a called party, the Pre-Paid Charging subscriber must be authenticated by the Home SCP, which determines whether to establish a call or not and the duration of the call; here, the call can be made only if the Pre-Paid Charging subscriber has an account with enough balance. Furthermore, during the call of the Pre-Paid Charging subscriber, the HPLMN would monitor the call and charge for the subscriber in real time. Therefore, in view of above characteristic of the Pre-Paid Charging service, the Pre-Paid Charging service has a higher requirement for the network and a further requirement that the call control and charging rules must be determined by the HPLMN. As a result, most operators are unable to provide international roaming service for Pre-Paid Charging subscribers at present.

Even if the international roaming of a Pre-Paid Charging subscriber is allowed, the function of real-time charging for the Pre-Paid Charging subscriber in international roaming can not be completely implemented based on protocols of the CDMA intelligent network system in the art.

1. In the case where a Pre-Paid Charging subscriber becomes a called party after internationally roaming to the Visited Public Land Mobile Network (VPLMN):

If the Mobile Switching Center/Service Switching Point (MSC/SSP) in the VPLMN has a Wireless Intelligent Network (WIN) capability, then the Home Location Register (HLR) in the HPLMN dispatches a Trigger configuration of a Pre-Paid Charging subscriber to the MSC/SSP in the VPLMN when the terminal of the Pre-Paid Charging subscriber carries out location registration. However, usually there is no coordination on signaling addressing configuration at the intelligent network between operators in two countries/regions, respectively, therefore, no signaling exchange is carried out between the MSC/SSP in the VPLMN and the SCP in the HPLMN; as a result, in the case where a Pre-Paid Charging subscriber in international roaming becomes the called party, the SCP in the HPLMN cannot charge for the Pre-Paid Charging subscriber in real time.

For example, if the calling party is a subscriber in the HPLMN, due to the fact that the called process of an intelligent network subscriber is triggered at the initial calling office, i.e., at the MSC/SSP in the HPLMN, and the TANSWER (i.e., the called party answers) and TDISCONNECT (i.e., the called party releases) have to be reported by the MSC/SSP in the VPLMN because of special requirements of CDMA protocols; thus, the reporting may fail due to the network, resulting in that the SCP in the HPLMN cannot charge for the called party accurately.

If the calling subscriber is also in the VPLMN, the initial calling office of the call is the MSC in the VPLMN. In this case, after identifying the called number as a HPLMN number, the MSC in the VPLMN relays the call to the Gateway Mobile Switching Center in the HPLMN for triggering the called service logic of CDMA network, the signaling process herein is essentially identical to that in the case where a HPLMN subscriber calls a subscriber has roamed to the VPLMN; similarly, the SCP in the HPLMN therefore cannot charge for the called party.

2. In the case where a Pre-Paid Charging subscriber initiates a call after internationally roaming to the VPLMN:

If the MSC/SSP in the VPLMN has a WIN capability, then the HLR in the HPLMN dispatches a Trigger configuration of a Pre-Paid Charging subscriber to the MSC/SSP in the VPLMN when the terminal of the Pre-Paid Charging subscriber carries out location registration. However, usually there is no coordination on signaling addressing configuration at the intelligent network between operators in two countries, respectively, therefore, no signaling exchange is carried out between the MSC/SSP in the VPLMN and the SCP in the HPLMN; in this case, when the Pre-Paid Charging subscriber initiates a call, the MSC/SSP in the VPLMN cannot authenticate the Pre-Paid Charging subscriber, as the result, the Pre-Paid Charging subscriber is unable to initiate the call.

If having no WIN capability, the MSC/SSP in the VPLMN would not carry out signaling exchange with the SCP in the HPLMN; as the result, the Pre-Paid Charging subscriber in international roaming is out of the control of the SCP in the HPLMN, and therefore the Pre-Paid Charging subscriber may initiate calls freely, just like a Post-Paid Charging subscriber.

In the conventional art, the CDMA intelligent network cannot control and charge for a call of the Pre-Paid Charging subscribers in international roaming, and therefore cannot provide an international roaming service for the Pre-Paid Charging subscriber.

SUMMARY OF THE INVENTION

According to embodiments of the present invention, there is provided a CDMA intelligent network system and a method for implementing an international roaming service in the CDMA intelligent network system.

Embodiments of the present invention provide the following technical schemes:

A CDMA intelligent network system includes: a Home Service Control Point (SCP), a Home Gateway Mobile Switching Center (GMSC) or Home International Switching Center (ISC), and a visited GMSC or visited ISC. The CDMA intelligent network system further includes a roaming Service Switching Point (SSP). The SCP is in communication with the roaming SSP, and voice channels are established among the roaming SSP, the Home GMSC or Home ISC, and the visited GMSC or ISC.

A method for implementing an international roaming service, includes the following steps:

after an intelligent called process of a Pre-Paid Charging subscriber in international roaming is triggered at the Home MSC/SSP, assigning a roaming number to the called subscriber and returning the roaming number to the Home SCP, by the visited MSC/SSP, if the called subscriber has an account with enough balance;

instructing, by the Home SCP, the Home MSC/SSP to route a voice channel for the call to the roaming SSP;

dispatching, by the Home SCP, the roaming number to the roaming SSP, and starting to monitor the call; and routing, by the roaming SSP, the call according to the roaming number to connect the visited MSC/SSP, so that a conversation can be carried out.

A method for implementing an international roaming service includes the following steps:

after a Home SCP learns that a call request is initiated by a Pre-Paid Charging subscriber in international roaming, obtaining from a visited MSC/SSP, by the Home SCP, a roaming number assigned to the calling subscriber, if the calling subscriber has an account with enough balance;

instructing, by the SCP, the roaming SSP to establish a voice channel for the calling subscriber, sending the roaming number to the roaming SSP, and monitoring the call; and instructing, by the SCP, the roaming SSP to establish a voice channel for the called subscriber, so that a conversation can be carried out.

A roaming SSP, which is adapted for message exchanging with the Home SCP of a subscriber in international roaming so as to establish a service route for the subscriber in international roaming in the CDMA intelligent network, includes:

a signaling exchange unit adapted for signaling exchanging with the SCP and obtaining a roaming number of the international roaming subscriber which is dispatched by the SCP; and a voice channel establishment unit adapted for routing a call, according to the roaming number, and establishing bridged voice channels for the calling subscriber and the called subscriber.

A SCP, which is adapted for: signaling exchanging with the roaming SSP which supports GSM CAMEL (Customized Applications for Mobile Network Enhanced Logic) Application Part (CAP) protocol, and controlling services provided for subscribers in international roaming, includes:

a CDMA network interface, which supports CDMA Wireless Intelligent Network-Mobile Application Part (CDMA WIN MAP) protocol, and is adapted for signaling exchanging with Home Location Register and MSC/SSP for the subscriber in international roaming through the CDMA WIN MAP protocol; and a GSM network interface, which supports GSM CAMEL Application Part (GSM CAP) protocol, and is in communication with the roaming SSP through the GSM CAP protocol.

It can be seen from above technical schemes that according to the embodiments of the invention, a roaming SSP is introduced into the CDMA intelligent network system and the method for implementing an international roaming service in the CDMA intelligent network system, the calling process and called process of a Pre-Paid Charging subscriber in international roaming can be triggered to the Home SCP via the roaming SSP, and the Home SCP can monitor calls according to the balance in the accounts of the Pre-Paid Charging subscriber and charge for the calls in real time, thereby the international roaming service is provided for Pre-Paid Charging subscriber.

DETAILED DESCRIPTION OF THE EMBODIMENTS

Hereinafter, the present invention will be further described in the embodiments with reference to the accompanying drawings.

Figure 1:
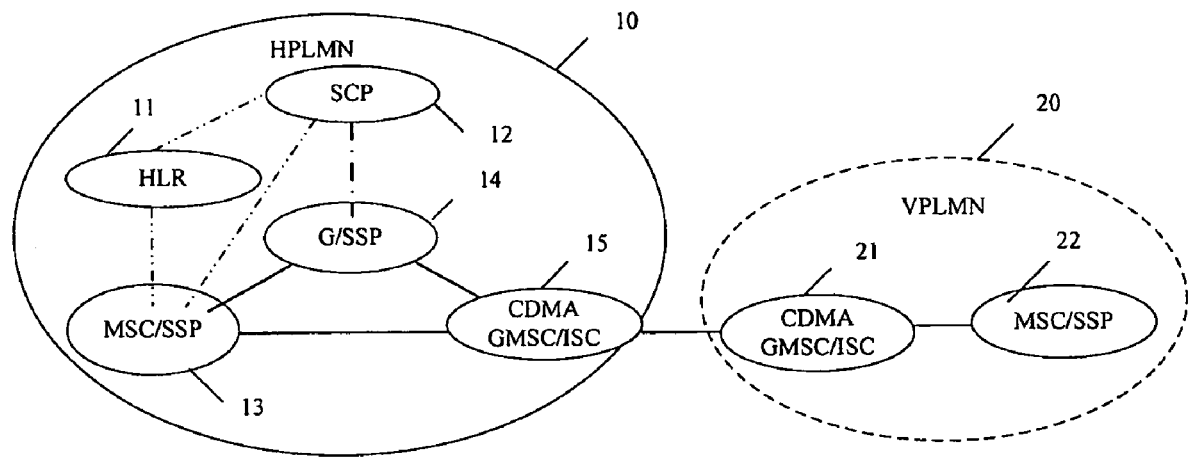
FIG. 1 is a schematic diagram of a network structure of a CDMA intelligent network system, according to an embodiment of the present invention.

With reference to FIG. 1, a schematic diagram of a network structure of the CDMA intelligent network system according to the embodiment of the present invention is shown. The CDMA intelligent network system includes a HPLMN 10 and a VPLMN 20. The HPLMN 10 includes a HLR 11, a Service Control Point (SCP) 12, a MSC/SSP 13, a GSM SSP (G/SSP) 14, and a CDMA Gateway Mobile Switching Center or International Switching Center (GMSC/ISC) 15; and the VPLMN 20 includes a CDMA GMSC/ISC 21 and a MSC/SSP 22. As shown, the solid lines denote voice channels for the subscriber, the double dots lines denote CDMA WIN MAP protocol, and the dash and dot line denotes GSM CAP protocol.

In the CDMA intelligent network system, signaling is transferred among the MSC/SSP 13, the HLR and the SCP in the HPLMN through the CDMA WIN MAP protocol, the SCP 12 and the G/SSP 14 in the HPLMN are in communication with each other through the GSM CAP protocol, and voice channels are established among the MSC/SSP 13, the G/SSP 14, the GMSC/ISC 15, the GMSC/ISC 21, and the MSC/SSP 22.

Because the signaling process of GSM network is relatively well defined, the GSM CAP protocol and the G/SSP are introduced into the inventive CDMA intelligent network system for triggering, controlling and real-time charging for international roaming call process, so that the operators can provide the international roaming service for Pre-Paid Charging subscribers.

Hereinafter, the particular signaling process of the method for implementing an international roaming service in CDMA intelligent network system according to the embodiment will be described with two call scenarios, respectively. In one of these two call scenarios, the calling subscriber is in the HPLMN and the called subscriber is a Pre-Paid Charging subscriber in the VPLMN. In the other of these two call scenarios, the calling subscriber is a Pre-Paid Charging subscriber in the VPLMN.

Figure 2:
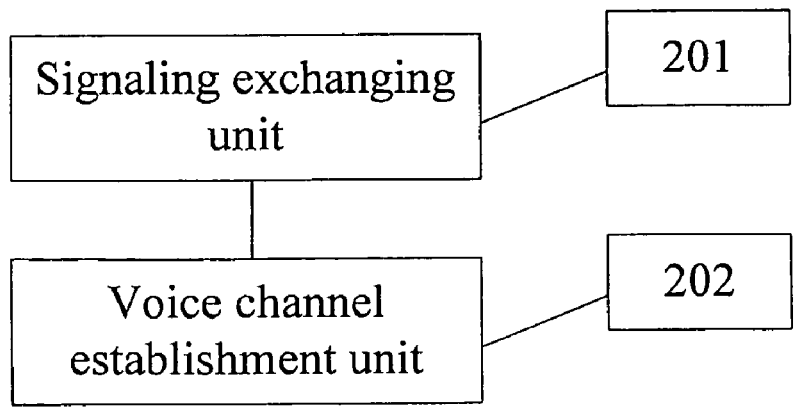
FIG. 2 is a functional block diagram of a roaming SSP, according to an embodiment of the present invention.

In order to implement the international roaming service in a CDMA network, in other words, to enable the Home SCP to charge for the international roaming subscriber accurately, a preferred embodiment of the roaming SSP as shown in FIG. 2 is provided in the present invention.

In the present embodiment, the roaming SSP includes a signaling exchange unit 201 and a voice channel establishment unit 202. The signaling exchange unit 201 carries out signaling exchange with the SCP to obtain a roaming number of the subscriber in international roaming which is dispatched by the SCP, and the voice channel establishment unit 202 is adapted for establishing and bridging voice channels for the calling subscriber and the called subscriber.

Figure 3:
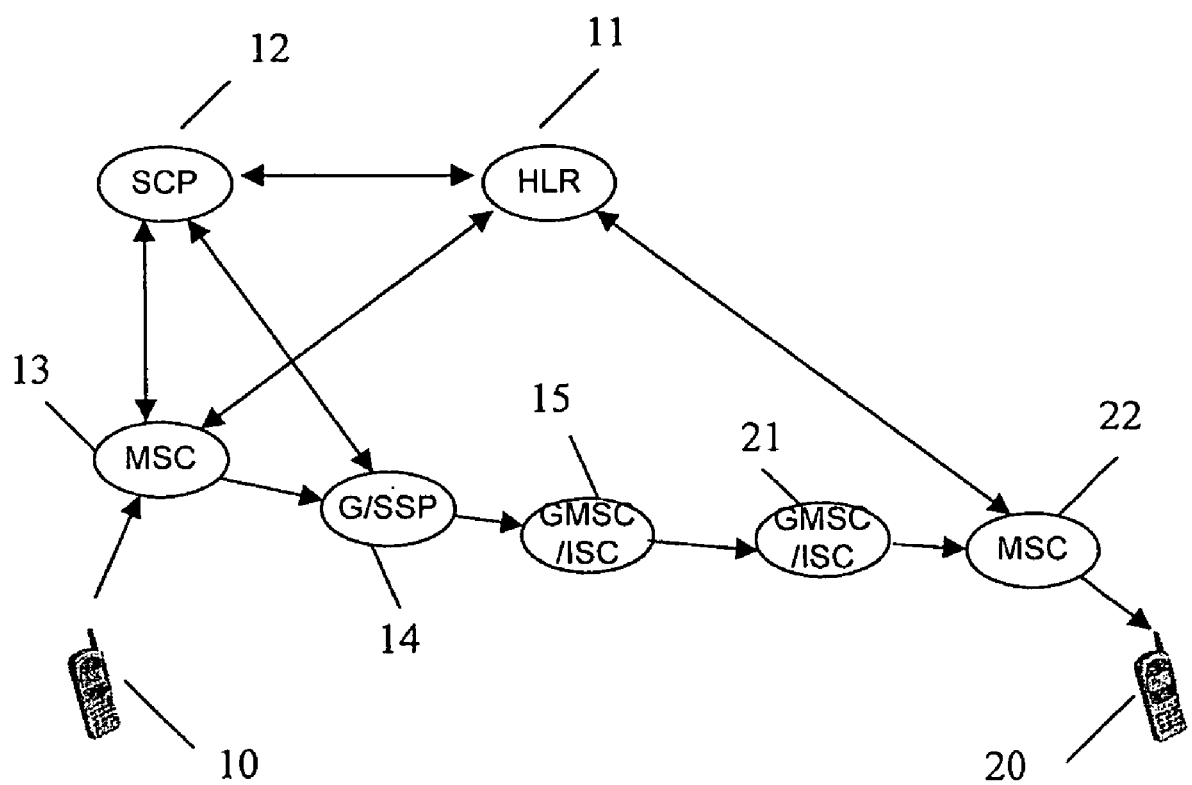
FIG. 3 is a schematic diagram of a call in the network structure as shown in FIG. 1, with the calling subscriber being in the HPLMN and the called subscriber being a Pre-Paid Charging subscriber in the VPLMN.

With reference to FIG. 3, a schematic diagram of a call in the CDMA intelligent network system, according to the embodiment of the invention is shown in FIG. 3, with the calling subscriber being in the HPLMN and the called subscriber being a Pre-Paid Charging subscriber in the VPLMN. As shown, the reference numeral 10 denotes a calling subscriber MSa located in the HPLMN; and the reference numeral 20 denotes a called subscriber MSb located in the VPLMN, which is a Pre-Paid Charging subscriber of the HPLMN.

Figure 4:
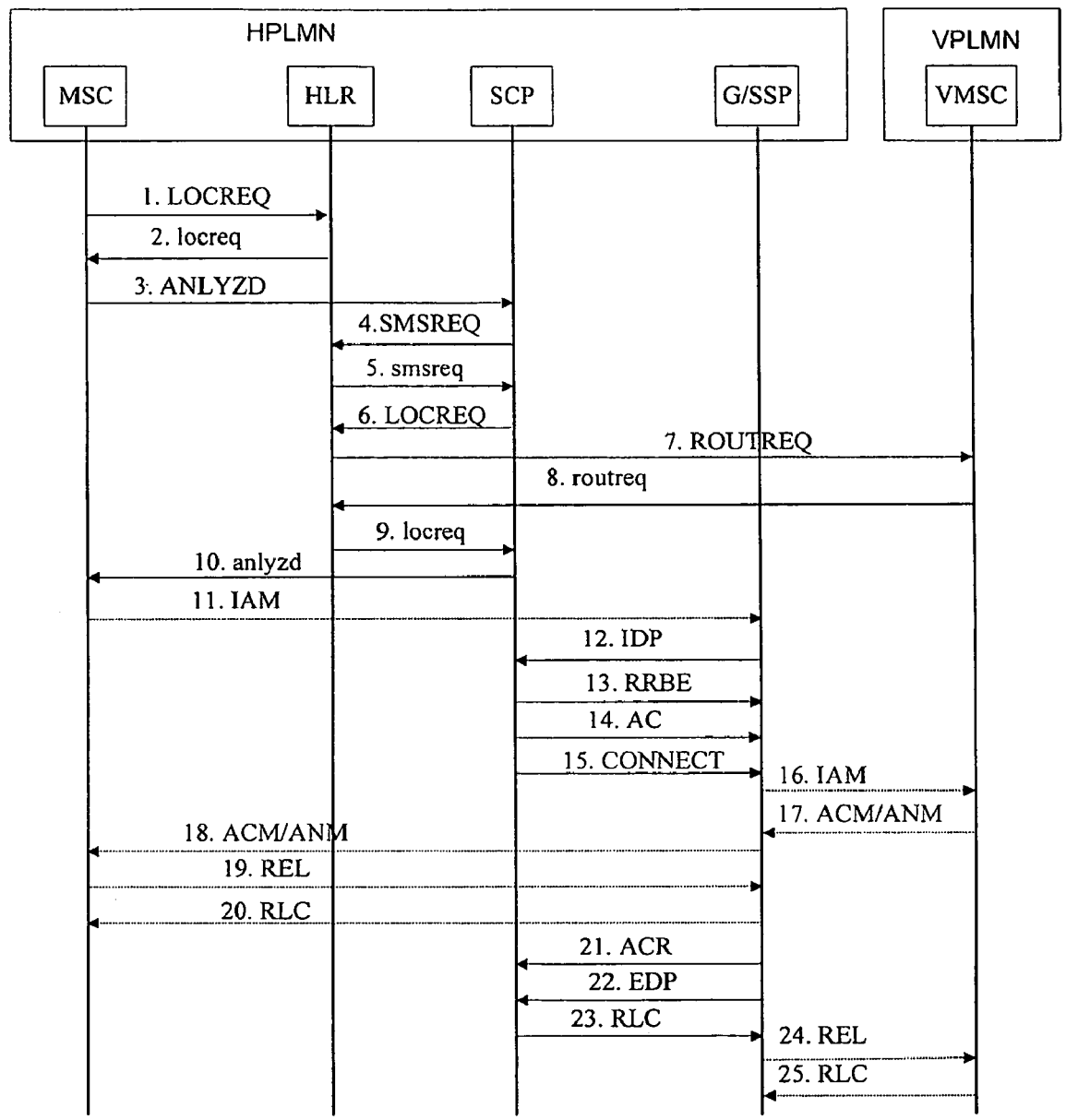
FIG. 4 is a schematic diagram of the illustrative signaling process in the CDMA intelligent network system having the network structure as shown in FIG. 1, according to the invention, where the calling subscriber is in the HPLMN, and the called subscriber is a Pre-Paid Charging subscriber in the VPLMN.

The particular signaling process for calling the subscriber MSb by the subscriber MSa in FIG. 3 is shown in FIG. 4, and the signaling process includes the following: when the subscriber MSa in the HPLMN initiates a call to the Pre-Paid Charging subscriber MSb in the VPLMN, the MSC 13 in the HPLMN receives the call and obtains address digits (i.e. Mobile Directory Number (MDN)) of the called mobile station by analyzing the number dialed by the calling subscriber. Subsequently, the signaling process proceeds with the following:

Step 1: The MSC 13 triggers a trigger Mobile_Termination and sends a LOCREQ message to the HLR 11 in the HPLMN, with the message containing the following parameters:
MSCID: an ID of the MSC triggering the service;
MSID: an ID of the subscriber MSb;
MDN: a Mobile Directory Number of the subscriber MSb;
BILLID: a Billing ID of the call;
DGTDIAL: digits dialed by the subscriber MSa; and
TriggerType: a trigger type, the value of which is 32 (Mobile_Termination).

Step 2: The HLR 11 returns to the MSC 13 a locreq message, which contains a subscriber data list in addition to some necessary parameters. The subscriber data list includes a trigger address list (TRIGADDRLIST), and is configured with triggers such as Initial_Termination, Location, and Called_Routing_Address_Available.

Step 3: The MSC 13 triggers the trigger Initial_Termination and sends an ANLYZD message to the SCP 12 in the HPLMN, where the SCP 12 is specified in the parameter TRIGADDRLIST, and the parameter TRIGTYPE set in the ANLYZD message indicates that the trigger Initial_Termination is triggered.

Step 4: If determining that the called Pre-Paid Charging subscriber MSb has activated the Pre-Paid Charging (PPC) service, has an account with enough balance, and has subscribed the international roaming service, the SCP 12 sends a SMSREQ message to the HLR 11 for the called Pre-Paid Charging subscriber MSb, to query for the address of the visited MSC.

Step 5: The HLR 11 returns to the SCP 12 a smsreq message containing the SMSADDR. If determining the MSC as oversea through analyzing the SMSADDR (in the GT format), the SCP 12 proceeds with the process at step 6; and if determining the MSC as domestic through analyzing the SMSADDR, the SCP 12 proceeds according to the normal process.

Step 6: if determining that the called Pre-Paid Charging subscriber MSb is in international roaming and has an account with enough balance affording the call, the SCP 12 sends to the HLR 11 a LOCREQ message containing the parameter TRIGTYPE, where the parameter TRIGTYPE indicates that a trigger Location (34) is triggered and the same Billing ID is used.

Step 7: The HLR 11 determines to proceed with the call processing, and sends a ROUTREQ message to the Visited Location Register (VLR) which forwards the ROUTREQ message to the MSC 22.

Step 8: The MSC 22 assigns a Temporary Local Directory Number (TLDN) and returns a result to the VLR, and the VLR returns the result to the HLR 11 via a ROUTREQ message;

Step 9: The HLR 11 sends a LOCREQ message to the SCP 12, instructing to relay the call to the subscriber MSb;

Step 10: The SCP 12 stores the value of the TLDN. Further, the SCP 12 sends to the MSC 13 an ANLYZD message containing a parameter DMH_SVCID which indicates the PPC service, and the PSTNTermination in the TerminationList parameter is the called number prefixed to with a route prefix, i.e. xxx+called number.

At this point, the service logic cannot be terminated yet, and the SCP 12 needs to wait for a certain period of time to respond to the ANLYZD (39) to ensure the call relay. In addition, the SCP 12 needs to wait a TANSWER or a conditional forwarding process for a certain period of time, so as to support the conditional forwarding process.

Step 11: The MSC 13 dispatches an Initial Address Message (IAM), according to the indication of the route prefix, and routes directly the call channel to the G/SSP 14.

Step 12: According to the prefix (i.e. the above-mentioned route prefix) of the called number, the G/SSP 14 triggers the calling intelligent process through the access code.

Step 13: The SCP 12 dispatches a Request Report Basic Call Status Model (BCSM) Event (RRBE).

Step 14: In the GSM intelligent calling process, the SCP 12 queries for the value of the TLDN stored at step 7, analyzes the location of the called subscriber, and begins the charging.

Step 15: The SCP 12 dispatches directly the TLDN to the G/SSP 14, to instruct the G/SSP 14 to route the call.

Step 16: The G/SSP 14 relays the call according to the TLDN, and sends an Initial Address Message, to connect the GMSC/ISC 15 in the HPLMN of the subscriber MSb; the GMSC/ISC 15 in the HPLMN of the subscriber MSb relays the call according to the TLDN, and sends an IAM message, to connect the GMSC/ISC 21 in the VPLMN of the subscriber MSb; the GMSC/ISC 21 in the VPLMN of the subscriber MSb relays the call to the MSC 22; and the MSC 22 connects the subscriber MSb, thereby finishing the call relay.

Step 17: If the subscriber MSb answers the call, the MSC 22 reports an acknowledge message ACM/ANM, which is returned to the G/SSP 14 via the GMSC/ISC 21 and the GMSC/ISC 15.

Step 18: After the acknowledge message ACM/ANM is forwarded to the MSC 13, a conversation between the calling subscriber and the called subscriber can be started.

Step 19: At the end of the conversation between the calling subscriber and the called subscriber, and the subscriber MSa hangs up, then the MSC 13 sends a REL message to the G/SSP 14 to instruct to release the call.

Step 20: The G/SSP 14 responds with a Release of Call (RLC) message.

Step 21: The G/SSP 14 reports an ACR message to the SCP 12, and the SCP 12 deducts the charge and provides a call bill.

Step 22: The G/SSP 14 reports a hangup event EDP (which is a BCSM event report) to the SCP 12.

Step 23: The SCP 12 responds with a RLC message.

Step 24: The G/SSP 14 instructs the MSC 22 to hangup the call.

Step 25: The MSC 22 responds with a RLC message to the G/SSP 14.

It can be seen from the above particular calling process and signaling process that in the present invention, the GSM CAP protocol and the G/SSP are introduced into the CDMA intelligent network system, the called process of a Pre-Paid Charging subscriber in international roaming can be triggered to the Home SCP via the G/SSP, and the SCP in HPLMN can monitor calls according to the balance in the accounts of the Pre-Paid Charging subscriber and charge for the calls in real time, thereby the international roaming service is provided for Pre-Paid Charging subscriber.

If the calling subscriber is also in the VPLMN, the initial calling office of the call is the MSC 22 in the VPLMN. In this case, after identifying the called number as a HPLMN number, the MSC 22 in the VPLMN relays the call to the Gateway Mobile Switching Center in the HPLMN for triggering the called service logic of CDMA network, and the signaling process herein is essentially identical to that in the case where a subscriber in the HPLMN calls a subscriber that has roamed to the VPLMN.

Figure 5:
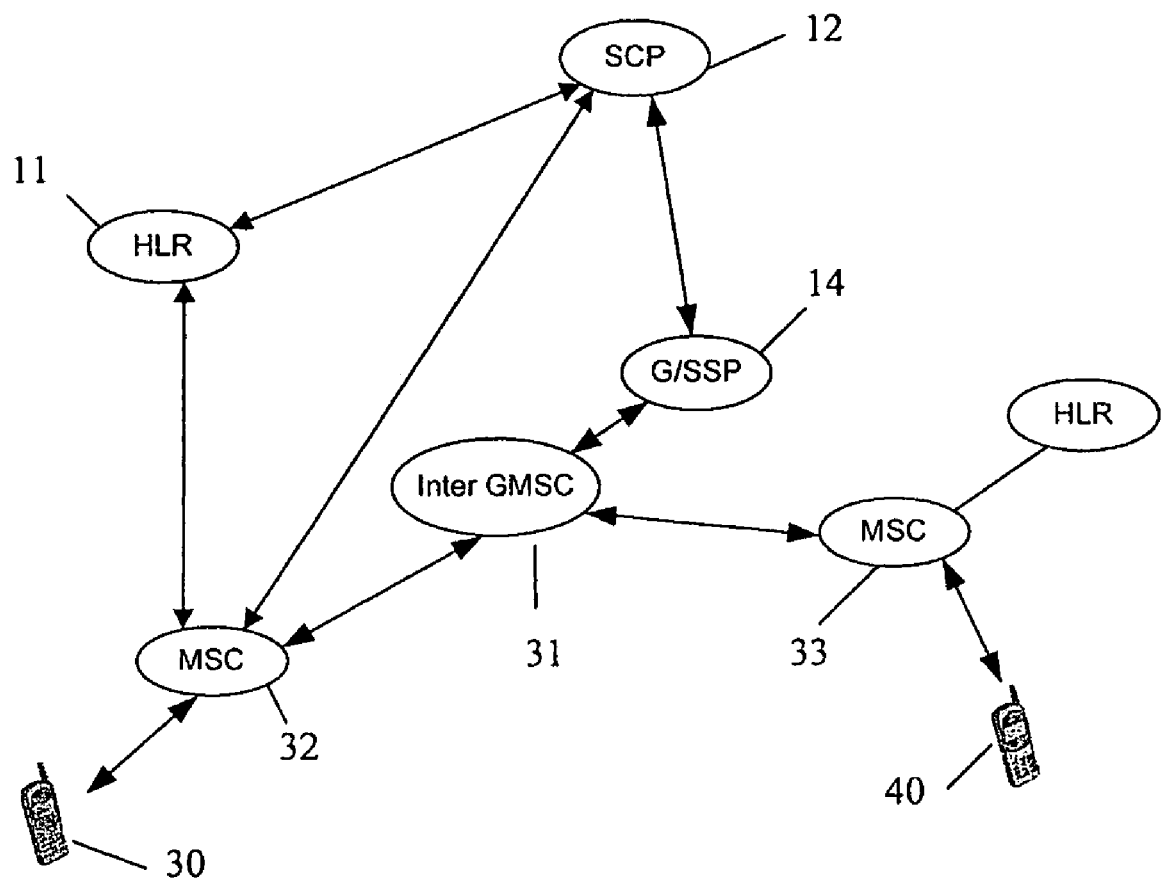
FIG. 5 is a schematic diagram of a call in the CDMA intelligent network system, according to the present invention, with the calling subscriber being a Pre-Paid Charging subscriber in international roaming.

With reference to FIG. 5, a schematic diagram of a call in the CDMA intelligent network system according to the embodiment of the present invention is shown, with the calling subscriber being a Pre-Paid Charging subscriber in international roaming. As shown, the reference numeral 30 denotes a calling subscriber MSc located in the VPLMN, which is a Pre-Paid Charging subscriber in international roaming; and the reference numeral 40 denotes a called subscriber MSd located in the VPLMN.

Figure 6:
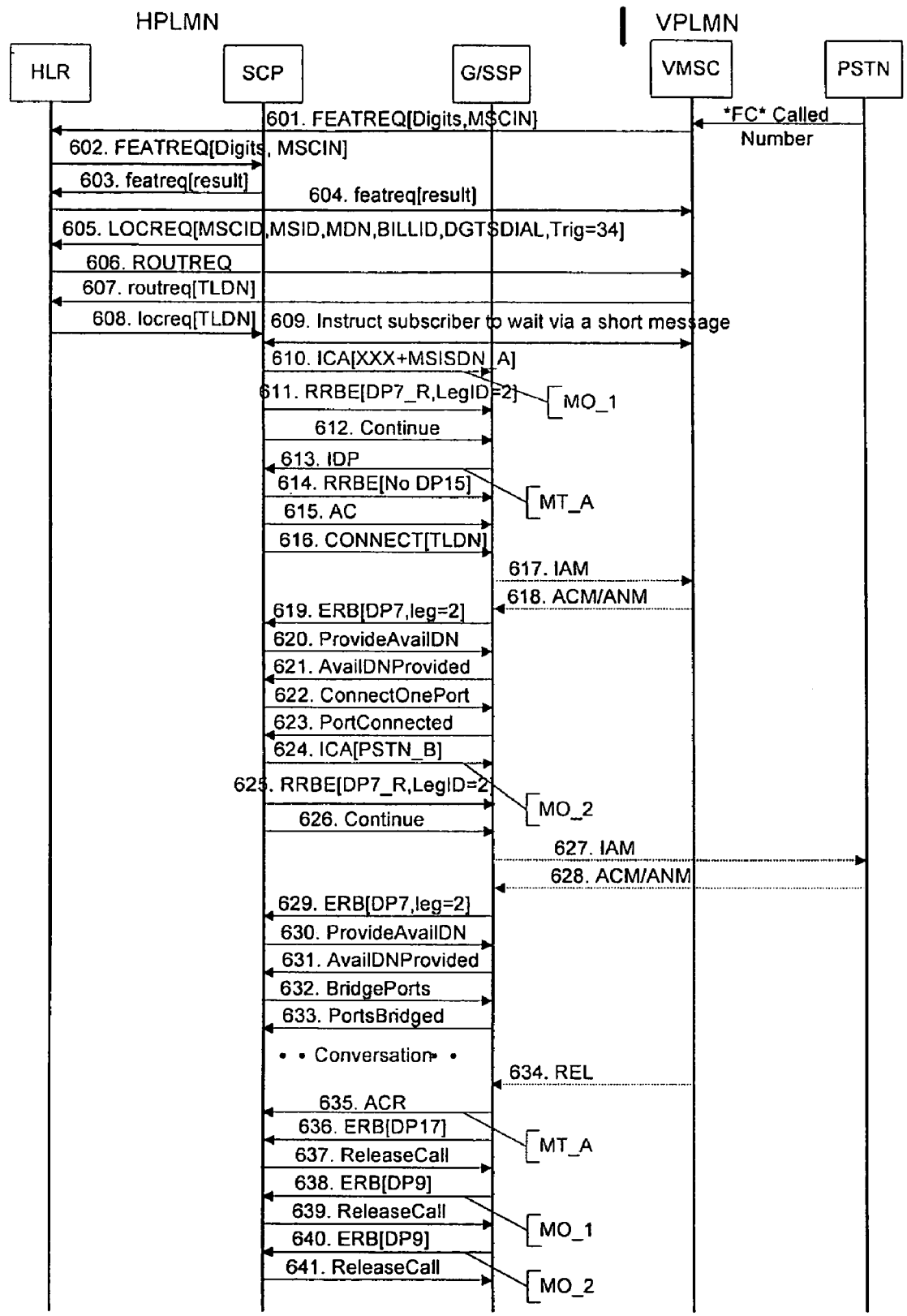
FIG. 6 is a schematic diagram of the illustrative signaling process in the CDMA intelligent network system, according to the present invention, with the calling subscriber being a Pre-Paid Charging subscriber in international roaming.

The particular signaling process for calling the subscriber MSd by the subscriber MSc in FIG. 5 is shown in FIG. 6, and the signaling process includes the following: to initiate a call, the Pre-Paid Charging subscriber MSc in international roaming dials a FEATURE CODE in the format of "*FC*the called number," where the called number includes an international call prefix of the home country, a country code of the called subscriber, and a phone number of the called subscriber. Subsequently, the signaling process proceeds with the following.

Step 601: The MSC 32 in the VPLMN sends a FEATREQ message to the HLR 11 in the HPLMN for the Pre-Paid Charging subscriber MSc, according to the IS-41D (Cellular Radio Telecommunications Intersystem Operations) specification.

Step 602: The HLR 11 in the HPLMN forwards the FEATREQ to the SCP 12 in the HPLMN, according to the IS-771 (Wireless Intelligent Network) specification.

Step 603: Upon the receipt of the FEATREQ request, the SCP 12 in the HPLMN returns normally a FEATREQ message to the HLR 11 in the HPLMN.

Step 604: The HLR 11 in the HPLMN forwards the FEATREQ message to the MSC 32 in the VPLMN.

Step 605: If determining that the calling Pre-Paid Charging subscriber MSc has activated the PPC service, has an account with enough balance, and has subscribed the international roaming service, the SCP 12 sends a LOCREQ message to the HLR 11. A Billing ID created by the SCP 12 itself is used.

Step 606: The HLR 11 sends a ROUTREQ message to the VLR, which forwards the ROUTREQ message to the MSC 32.

Step 607: The MSC 32 assigns a TLDN and returns a result to the VLR, which returns the result to the HLR 11.

Step 608: The HLR 11 sends a LOCREQ message to the SCP 12.

Step 609: Upon determining through analysis that the account balance of the subscriber is enough to pay the call, the SCP 12 stores the value of the TLDN, in addition, the SCP 12 instructs the subscriber MSc to wait for establishment of the calling process by sending a short message.

Step 610: The SCP 12 dispatches an ICA (Initiate Call Attempt) message to the G/SSP 14, where the destination Routing Address is filled with an access code plus the phone number of the subscriber MSc, i.e. xxx+the called number, and the CallingPartyNumber is the phone number of the subscriber MSd.

Step 611: The SCP 12 dispatches a RRBE to monitor DP7_R (LegID=2) (calling subscriber responding event). Here, the RRBE is used for state monitoring for the MO_CCF (Mobile-Origination call control function point) 1; in this case, the virtual calling party is ICA, regardless of that whether the subscriber MSd is an intelligent network user or not.

Step 612: The SCP 12 dispatches a CONTINUE.

Step 613: The G/SSP 14 triggers a MT end intelligent process of the subscriber MSc, according to the prefix of the called number, and sends an IDP (Initial Detection Point) to the SCP 12.

Step 614: The SCP 12 dispatches a RRBE.

Step 615: The SCP 12 dispatches an AC, and evaluates the account balance and begins call monitoring with respect to the user.

Step 616: The SCP 12 dispatches a CONNECT, with the previously stored TLDN dispatched to the G/SSP 14.

Step 617: The G/SSP 14 sends an IAM to the ISC, according to the TLDN, and the ISC forwards the IAM to the serving MSC 32 of the subscriber MSc.

Step 618: The MSC 32 responds with an ACM/ANM message.

Step 619: Upon the receipt of the ANM message (e.g. the response of the subscriber MSc), the G/SSP 14 reports a DP7 (LegID=2) to the SCP 12.

Step 620: The SCP 12 dispatches a ProvideAvailDN (i.e. a request for providing an available Distinguish Name, and a playback indication may be included).

Step 621: The SRF (Specialized Resource Function) queries for the circuit resources, assigns a DN (Distinguish Name), and returns an AvailDNProvided message.

Step 622: The SCP 12 dispatches a ConnectOnePort.

Step 623: The SRF occupies the resource and returns a PortConnected. At this point, the playback for the subscriber MSc is started if the ProvideAvailDN above includes a playback indication.

Step 624: The SCP 12 dispatches an ICA, where the calling number is a phone number of the subscriber MSc, and the destinationRoutingAddress is the phone number of the subscriber MSd;

Step 625: The SCP 12 also dispatches a RRBE monitoring EDP 7 (LegID=2) (i.e. establishment of MO state monitoring for the subscriber MSc).

Step 626: The SCP 12 dispatches a Continue to instruct call relay.

Step 627: The G/SSP 14 routes the call to the ISC, according to the phone number of the subscriber MSd;

Step 628: The subscriber MSd answers, and the MSC 33 returns an ACM/ANM to the G/SSP 14.

Step 629: the G/SSP 14 reports an ERB (DP=7, LegID=2) (MO_CCF2) to the SCP 12.

Step 630: The SCP 12 dispatches a ProvideAvailDN.

Step 631: Upon finding the circuit resources for the subscriber MSd through query, the SRF assigns a DN and returns an AvailDNProvided.

Step 632: The SCP 12 dispatches a BridgePorts (i.e. a request for bridging the ports).

Step 633: The SRF occupies the circuit resources to the user MSd, bridges the subscriber MSc/MSd and returns a PortsBridged, so that the subscriber MSc/MSd can hold a normal conversation.

Step 634: If the subscriber MSc releases the call, the MSC 32 sends a REL to the G/SSP 14.

Step 635: The event that the subscriber MSc releases the call is firstly monitored by MT process of the subscriber MSc of the G/SSP 14, and the G/SSP 14 reports an ACR.

Step 636: The G/SSP 14 reports an ERB (DPi7) (BCSM event report).

Step 637: The SCP 12 dispatches a ReleaseCall to release the MT process of the subscriber MSc; at this point, the SCP 12 may charge for the subscriber and deduct the charge.

Step 638: Subsequently, the MO_CCF1 for the G/SSP 14 detects the event, and reports an ERB (DP9).

Step 639: The SCP 12 dispatches a ReleaseCall.

Step 640: In view that the MO-CCF1 and the MO-CCF2 serve as the calling party for each other in the schemes, the MO-CCF sends the ReleaseCall to the MO-CCF2, and reports an ERB (DP9).

Step 641: The SCP 12 dispatches a ReleaseCall.

Although the ICA_1 serves as the virtual calling side for the MO-CCF1 and the ICA_2 serves as the virtual calling side for the MO-CCF2 in above process, in practical implementations, the MO-CCF1 and the MO-CCF2 may serve as the calling party for each other.

It can be seen from the above particular calling process and signaling process that in the present invention, the GSM CAP protocol and the G/SSP are introduced into the CDMA intelligent network system, the calling process of a Pre-Paid Charging subscriber in international roaming can be triggered to the Home SCP via the G/SSP, and the SCP in HPLMN can monitor calls according to the balance in the account of the Pre-Paid Charging subscriber and charge for the calls in real time, thereby the international roaming service is provided for Pre-Paid Charging subscriber.

According to the present invention, there is provided a further Service Control Point, which is adapted for signaling exchanging with the roaming Service Switching Point which supports GSM Customized Applications for Mobile Network Enhanced Logic Application Part protocol, thereby controlling services provided for subscribers in international roaming.

Figure 7:
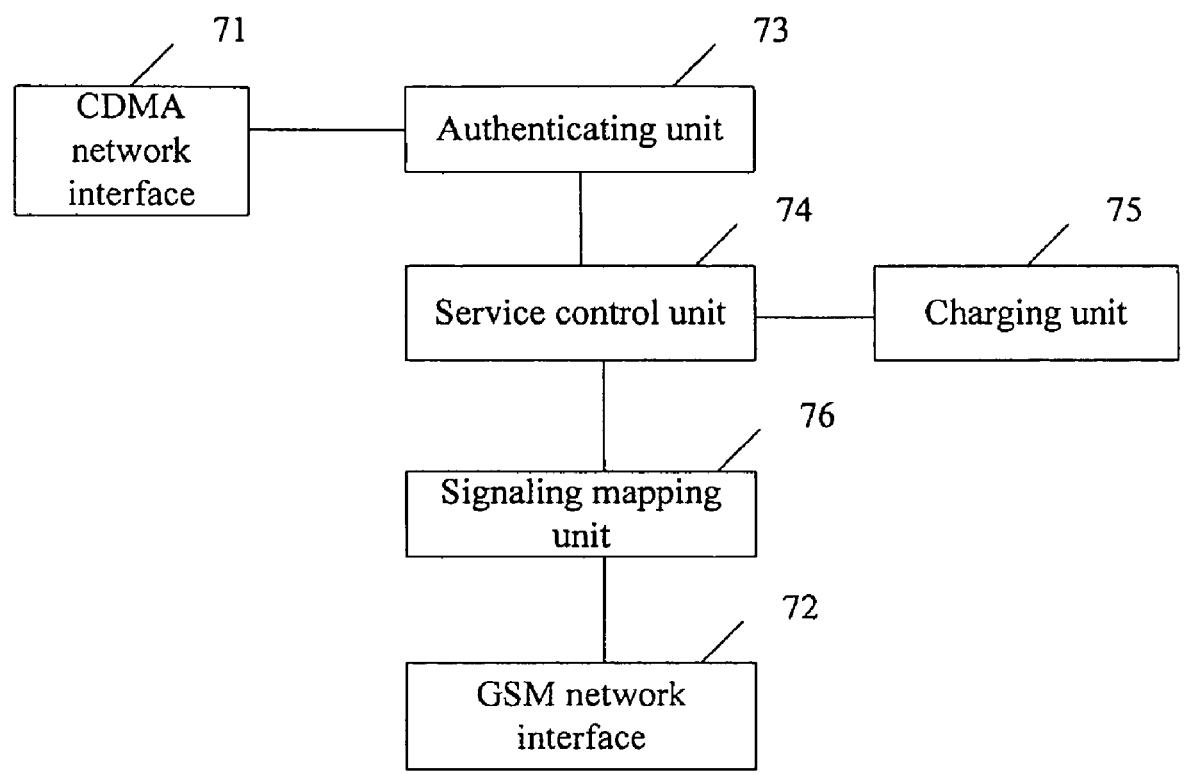
FIG. 7 is a functional block diagram of the SCP, according to the preferred embodiment of the present invention.

FIG. 7 is a functional block diagram of the Service Control Point, according to a preferred embodiment of the present invention.

In the present embodiment, the inventive Service Control Point includes: a CDMA network interface 71, a GSM network interface 72, an authenticating unit 73, a service control unit 74, and a charging unit 75. The CDMA network interface 71 is in compliance with the CDMA WIN MAP protocol, and carries out signaling exchange with the Home Location Register and MSC/SSP for the subscriber in international roaming through the CDMA WIN MAP protocol. The GSM network interface 72 is in compliance with the GSM CAMEL Application Part protocol, and is in communication with the roaming SSP through the GSM CAMEL Application Part protocol.

The authenticating unit 73 is adapted for authenticating subscribers in international roaming that have subscribed a Pre-Paid Charging service. After the authentication is passed successfully, the service control unit 74 controls the call process of the subscriber in international roaming through signaling messages exchanged with other devices via the CDMA network interface 71 and the GSM network interface 72, respectively. The charging unit 75 is adapted for monitoring the call process, and charging for the subscriber in international roaming through to the call process.

In order to enable a service application to identify messages exchanged with other devices via interfaces supporting different protocols, so as to control the service correctly, a signaling mapping unit 76 is provided between the service control unit 74 and the GSM network interface 72, for identifying signaling messages received via the GSM network interface 72, and mapping the CDMA WIN MAP protocol messages, which are to be sent by the SCP to the roaming SSP, into GSM CAP protocol messages for transmission to the GSM network interface 72.

The above descriptions are illustrative of the CDMA intelligent network system and the method for implementing an international roaming service, the roaming Service Switching Point and the Service Control Point according to embodiments of the present invention. The principles and implementations of the present invention are described with reference to particular embodiments, and all the embodiments are merely for better understanding of the principles and ideal of the present invention. Furthermore, it should be understood to those skilled in the art that various modifications can be made to the particular embodiments and application scope of the invention without departing from the ideal of the invention, and therefore the above descriptions are not to be construed as limitative of the invention.

What is claimed is:

1. A method for implementing an international roaming service in CDMA intelligent network system which comprises a Home Service Control Point, a Home Mobile Switching Center/Service Switching Point, a visited Mobile Switching Center/Service Switching Point, a roaming Service Switching Point, comprising:

receiving, by the Home Service Control Point, a call triggered at the Home Mobile Switching Center/Service Switching Point;

determining, by the Home Service Control Point, a called subscriber of the call is a Pre-Paid Charging subscriber in international roaming and has an account with enough balance;

sending, by the Home Service Control Point, a LOCREQ request to a Home Location Register of the called subscriber;

instructing, by the Home Location Register, the visited Mobile Switching Center/Service Switching Point of the called subscriber to assign a roaming number to the called subscriber, according to the LOCREQ request, and returning the roaming number to the Home Service Control Point;

instructing, by the Home Service Control Point, the Home Mobile Switching Center/Service Switching Point to route a voice channel for the call to the roaming Service Switching Point;

dispatching, by the Home Service Control Point, the roaming number to the roaming Service Switching Point, and starting to monitor the call; and routing, by the roaming Service Switching Point, the call according to the roaming number to connect the visited Mobile Switching Center/Service Switching Point, so that a conversation is carried out.

2. The method for implementing an international roaming service according to claim 1, wherein, the returning the roaming number to the Home Service Control Point comprises:

returning the assigned roaming number to the Home Location Register, by the visited Mobile Switching Center/Service Switching Point; and sending, by the Home Location Register, the roaming number to the Service Control Point.

3. The method for implementing an international roaming service according to claim 1, wherein, the Service Control Point starting to monitor the call comprises:

triggering an intelligent process of the Pre-Paid Charging called subscriber, by the roaming Service Switching Point; and analyzing, by the Service Control Point, a location of the called subscriber according to the roaming number and starting charging, in an intelligent process of the Pre-Paid Charging calling subscriber.

4. The method for implementing an international roaming service in CDMA intelligent network system according to claim 1, further comprising:

reporting, by the roaming Service Switching Point, a charge report to the Service Control Point at the end of the conversation, and deducting, by the Service Control Point, the charge and providing a call bill.

5. The method for implementing an international roaming service in CDMA intelligent network system according to claim 1, wherein the process of determining, by the Home Service Control Point, the called subscriber of the call is a Pre-Paid Charging subscriber in international roaming comprises:

querying, by the Home Service Control Point, for an address of the visited Mobile Switching Center/Service Switching Point of the called subscriber from a Home Location Register of the called subscriber, if it is determined that the called subscriber has activated the Pre-Paid Charging (PPC) service, has an account with enough balance, and has subscribed the international roaming service;

determining, by the Home Service Control Point, the visited Mobile Switching Center/Service Switching Point as oversea through analyzing the SMSADDR returned from the Home Location Register of the called subscriber, and determining the called subscriber is a Pre-Paid Charging subscriber in international roaming.

6. A method for implementing an international roaming service in CDMA intelligent network system which comprises a Home Service Control Point, a visited Mobile Switching Center/Service Switching Point, and a roaming Service Switching Point, comprising:

receiving, by the Home Service Control Point, a FEATREQ request from the visited Mobile Switching Center/Service Switching Point of a calling subscriber;

determining, by the Home Service Control Point, the calling subscriber of the FEATREQ request is a Pre-Paid Charging subscriber in international roaming and has an account with enough balance;

sending, by the Home Service Control Point, a LOCREQ request to a Home Location Register of the calling subscriber;

instructing, by the Home Location Register, the visited Mobile Switching Center/Service Switching Point of the calling subscriber to assign a roaming number to the calling subscriber, according to the LOCREQ request, and returning the roaming number to the Home Service Control Point;

instructing, by the Home Service Control Point, the roaming Service Switching Point to establish a voice channel for the calling subscriber, sending the roaming number to the roaming Service Switching Point, and monitoring the call; and instructing, by the Home Service Control Point, the roaming Service Switching Point to establish a voice channel for the called subscriber, so that a conversation is carried out.

7. The method for implementing an international roaming service according to claim 6, wherein, the returning the roaming number to the Home Service Control Point comprises:

returning the assigned roaming number to the Home Location Register, by the visited Mobile Switching Center/Service Switching Point; and sending, by the Home Location Register, the roaming number to the Service Control Point.

8. The method for implementing an international roaming service according to claim 6, wherein, the Service Control Point starting to monitor the call comprises:

triggering an intelligent process of the Pre-Paid Charging calling subscriber, by the roaming Service Switching Point; and analyzing, by the Service Control Point, a location of the calling subscriber according to the roaming number and starting charging, in an intelligent process of the Pre-Paid Charging calling subscriber.

9. The method for implementing an international roaming service according to claim 6, wherein, the roaming Service Switching Point establishing a voice channel for the calling subscriber comprises:

after the roaming Service Switching Point receives an Initiate Call Attempt Message dispatched by the Service Control Point, sending, by the roaming Service Switching Point, an Initial Address Message to an International Switching Center, according to the roaming number; sending, by the International Switching Center, an Initial Address Message to the visited Mobile Switching Center/Service Switching Point; returning a result, by the visited Mobile Switching Center/Service Switching Point; and reporting, by the roaming Service Switching Point, a voice channel establishment message to the Service Control Point, and starting playback for the Pre-Paid Charging subscriber, after the roaming Service Switching Point receives a message of the result.

10. The method for implementing an international roaming service according to claim 6, wherein, the roaming Service Switching Point establishing a voice channel for the called subscriber comprises:

routing, by the roaming Service Switching Point, the call to the Mobile Switching Center for the called subscriber, after the roaming Service Switching Point receives an Initiate Call Attempt Message dispatched by the Service Control Point; and reporting, by the roaming Service Switching Point, a voice channel establishment message to the Service Control Point, after the roaming Service Switching Point receives a message of the result responded by the called subscriber.

11. The method for implementing an international roaming service according to claim 9, wherein, the roaming Service Switching Point establishing a voice channel for the called subscriber comprises:

routing, by the roaming Service Switching Point, the call to the Mobile Switching Center for the called subscriber, after the roaming Service Switching Point receives an Initiate Call Attempt Message dispatched by the Service Control Point; and reporting, by the roaming Service Switching Point, a voice channel establishment message to the Service Control Point, after the roaming Service Switching Point receives a message of the result responded by the called subscriber.

12. The method for implementing an international roaming service according to claim 6, further comprising:

reporting, by the roaming Service Switching Point, a charge report to the Service Control Point at the end of the conversation, and deducting, by the Service Control Point, the charge and providing a call bill.

* * * * *

UNITED STATES PATENT AND TRADEMARK OFFICE
CERTIFICATE OF CORRECTION

| | | |
|---|---|---|
| PATENT NO. | : 8,060,087 B2 | Page 1 of 1 |
| APPLICATION NO. | : 12/243399 | |
| DATED | : November 15, 2011 | |
| INVENTOR(S) | : Lu et al. | |

It is certified that error appears in the above-identified patent and that said Letters Patent is hereby corrected as shown below:

Title Page, Item (56) under "References Cited," subsection "Other Publications," insert the following Non-Patent Literature Reference:

-- RONGDUO, "A Brief Introduction to the Third Stage of CDMA Wireless Intelligent Network Technology," Telecommunications Network Technology No. 3, March 3, 2004, China Academic Journal Electronic Publishing House --.

Signed and Sealed this
Seventh Day of February, 2012

David J. Kappos
*Director of the United States Patent and Trademark Office*